(12) United States Patent
Kielwein et al.

(10) Patent No.: US 9,643,569 B2
(45) Date of Patent: May 9, 2017

(54) LOCKING MECHANISM

(71) Applicant: TRW Automotive GmbH, Alfdorf (DE)

(72) Inventors: Thomas Kielwein, Eschach (DE); Elmar Koch, Asselfingen (DE)

(73) Assignee: TRW Automotive GmbH (DE)

( * ) Notice: Subject to any disclaimer, the term of this patent is extended or adjusted under 35 U.S.C. 154(b) by 34 days.

(21) Appl. No.: 14/420,699

(22) PCT Filed: Jul. 30, 2013

(86) PCT No.: PCT/EP2013/002250
§ 371 (c)(1),
(2) Date: Feb. 10, 2015

(87) PCT Pub. No.: WO2014/026735
PCT Pub. Date: Feb. 20, 2014

(65) Prior Publication Data
US 2015/0298648 A1    Oct. 22, 2015

(30) Foreign Application Priority Data
Aug. 15, 2012    (DE) .................. 10 2012 016 118

(51) Int. Cl.
*B60R 22/34*    (2006.01)
*B60R 22/38*    (2006.01)

(52) U.S. Cl.
CPC .................... *B60R 22/38* (2013.01)

(58) Field of Classification Search
CPC .............................. B60R 22/34; B60R 22/38
See application file for complete search history.

(56) References Cited

U.S. PATENT DOCUMENTS

| 2008/0029634 A1* | 2/2008 | Kim .................. B60R 22/41 242/383.4 |
| 2009/0057469 A1* | 3/2009 | Choi ................ B60R 22/405 242/382 |
| 2012/0111985 A1 | 5/2012 | Specht et al. |

FOREIGN PATENT DOCUMENTS

| DE | 102009034048 | 1/2011 |
| DE | 102012018475 | 4/2013 |
| EP | 0795447 | 1/2001 |

* cited by examiner

*Primary Examiner* — Sang Kim
(74) *Attorney, Agent, or Firm* — Tarolli, Sundheim, Covell & Tummino LLP

(57) ABSTRACT

A locking mechanism (18) for a belt reel (10) of a belt retractor in a vehicle, including a carrier (22) coupled to the belt reel (10) of the belt retractor, an inertia mass (24) which is pivoting to a limited extent relative to the carrier (22) and a leaf spring (28) applying the inertia mass (24) in a home position, includes at each of the carrier (22) and the inertia mass (24) a seat (34, 36) for the spring ends (30, 32) of the leaf spring (28) in which the spring ends (30, 32) of the leaf spring (28) are pivoted to a limited extent.

16 Claims, 3 Drawing Sheets

LOCKING MECHANISM

RELATED APPLICATIONS

This application corresponds to PCT/EP2013/002250, filed Jul. 30, 2013, which claims the benefit of German Application No. 10 2012 018 118.2. filed Aug. 15, 2012, the subject matter, of which are incorporated herein by reference in their entirety.

BACKGROUND OF THE INVENTION

The invention relates to a locking mechanism for a bait reel of a belt retractor in a vehicle comprising a carrier coupled to a belt reel of the belt retractor, an inertia mass which is pivoting to a limited extent relative to the carrier and a leaf spring applying the inertia mass in a home position.

The control of a blocking means of a belt reel in a vehicle is effectuated, for example, via a locking mechanism including a carrier coupled to the belt reel which carrier is coupled via a spring to an inertia mass that is pivoting to a limited extent relative to said carrier.

The spring is dimensioned so that the inertia mass co-rotates with the carrier and the belt reel during regular operation of the belt retractor. When the belt reel is accelerated due to sudden webbing extension, for instance by strong deceleration of the vehicle and the resulting displacement of a vehicle occupant, the inertia mass lags behind the movement of rotation of the carrier due to its high mass. By the displacement or swivel of the Inertia mass relative toward the carrier the blocking mechanism of the belt reel is triggered. The latter acts on the belt reel and blocks the same so that further webbing extension is prevented.

Apart from spiral springs, for such locking mechanism frequently a biased leaf spring is used which is clamped al the carrier and/or at the inertia mass. The acceleration at which relative movement of the carrier and the inertia mass takes piece is dependent, apart from the mass of the inertia mass, on the spring bias of said leaf spring. Due to the movement of the inertia mass relative to the carrier the distance and the orientation of the clamping points of the leaf spring are varying, however, so that the spring bias and thus the responsive behavior are varying during the relative movement of the inertia mass and the carrier.

Legal specifications prescribe that the locking mechanism has to be triggered upon acceleration of the webbing extension of from 0.8 to 2 g. These specifications can be easily observed by the locking mechanisms or supports of the spring known so far. However, frequently a substantially narrower trigger range is desired, preferably ranging between 1.4 to 15 and 2 g. Due to manufacturing tolerances and the displacement of the damping points of the leaf springs these specifications can be observed with very great effort only, however.

SUMMARY OF THE INVENTION

It is the object of the invention to provide a locking mechanism for a belt reel permitting with little manufacturing effort a more accurate adjustment of the acceleration at which the locking mechanism and thus the blocking means of the belt reel are triggered.

For achieving the object a locking mechanism for a belt reel of a belt retractor in a vehicle is provided comprising a carrier coupled to a belt real of the belt retractor, an inertia mass which is pivoting to a limited extent relative to the carrier and a leaf spring applying the inertia mass in a home position, wherein a seat for the ends of the leaf spring is provided at each of the carrier and the inertia mass in which seat the ends of the leaf spring are pivoted to a limited extent.

In the locking mechanisms known so far the leaf spring is tightly clamped on at least one end, but frequently also at both ends. This results in the fact that by the relative movement of the clamping points at the inertia mass and the carrier and, respectively, the mutual pivoting thereof also the angular orientation of the clamping points relative to each other is varied. This varied orientation of the clamping points entails an additional change of the spring tension, whereby the spring bias varies during the pivoting operation within a wide range.

In accordance with the invention, the ends of the leaf spring are movably, especially pivotally supported so that they can orientate themselves during relative movement of the inertia mass and the carrier in such way that no additional bias is applied to the spring by the clamping and the seat, respectively. Thus the variation of the bias is effectuated exclusively via the change of distance of the two receiving points, whereby a substantially smaller variation of the spring tension is brought about. This permits a substantially exacter adjustment of the acceleration values upon which the locking mechanism is triggered.

The seats may have a clearance, for example, in which the end of the leaf spring is inserted. The spring is preferably supported on the bottom of the clearance so that the spring contacts the seat only by the end of the spring. The lateral movement or, resp., a pivoting of the spring is not restricted thereby. The bearing point of the spring is not fixed, however, so that a displacement of this bearing point at the inertia mass and the carrier, resp., which might entail a further variation of the spring bias, is not possible.

The clearance is V-shaped, for instance. The pivoting range of the leaf spring in the seat is defined by the opening angle of the clearance in this embodiment. The ends of the leaf spring can be pivoted in the respective seat until the spring contacts a side face of the clearance.

The clearance may have an opening angle of up to 90°, for example, wherein the angle is chosen so that the movement of the leaf spring is not restricted over the entire possible pivoting range of the inertia mass against the carrier, but the leaf spring is reliably prevented from slipping out.

The seat can also have a bearing element for the ends of the spring which is movable to a limited extent. The ends of the spring can be tightly fixed in such bearing element, wherein the ends of the leaf spring can still orientate themselves by the pivotal support of the bearing element so that any additional pretensions are prevented from acting on the leaf springs by the seats.

Preferably the leaf spring is biased so that it is forced into the seats at the inertia mass and the carrier by the bias, in particular, the leaf spring is biased in a plane arranged perpendicularly to the axis of the belt reel. The inertia mass is usually supported so that it is pivotal or, resp., rotatabie about the axis of the belt reel. When the leaf spring is biased in a plane arranged perpendicularly to this axis, the leaf spring can be arranged exactly In the direction of movement of the inertia mass.

BRIEF DESCRIPTION OF THE DRAWINGS

Further advantages and features are found in the following description in conjunction with the enclosed drawings, in which.

DESCRIPTION

Figure 1:
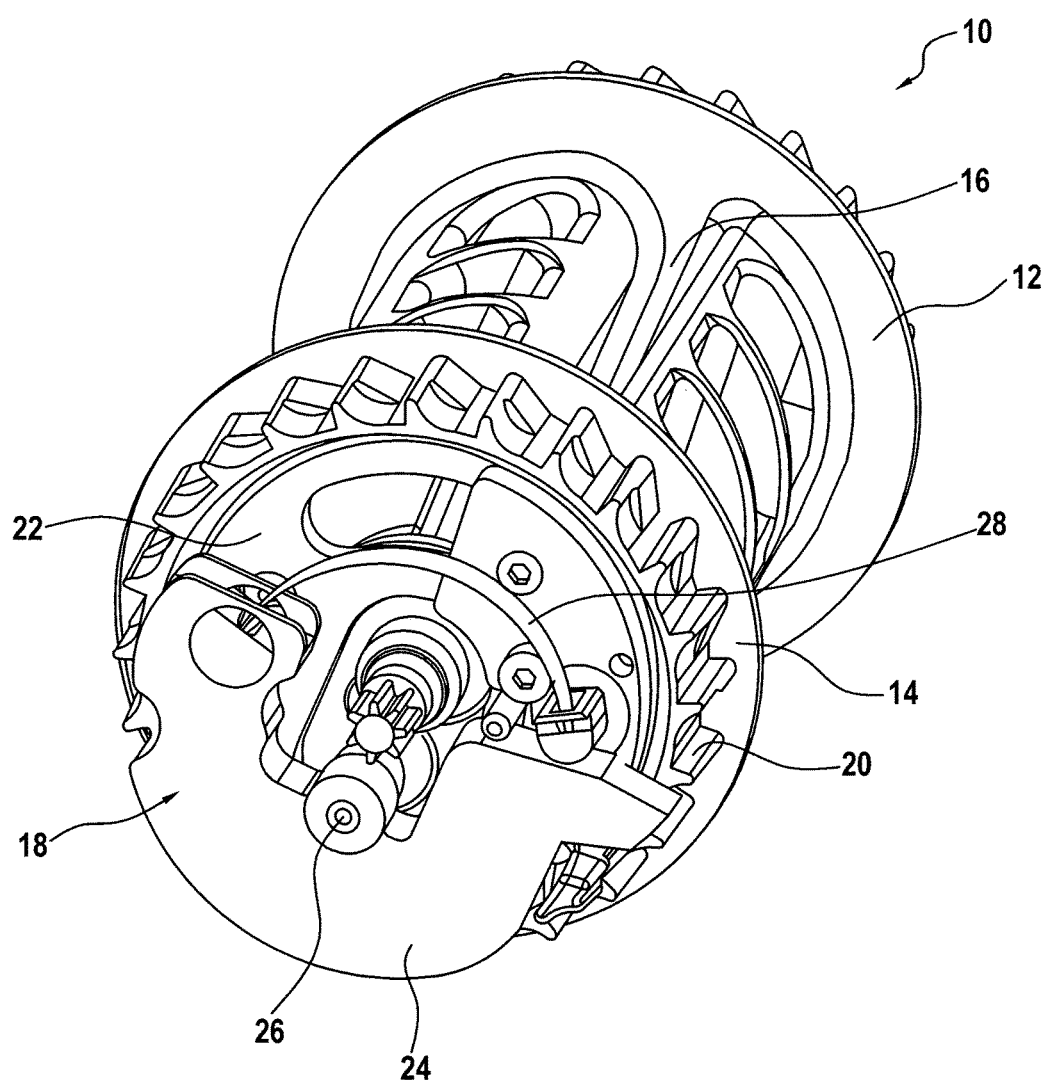
FIG. 1 shows a perspective view of a belt reel comprising a locking mechanism according to the invention.

FIG. 1 illustrates a belt reel 10 for a seat belt in a vehicle. The belt reel 10 includes a first flange 12, a second flange 14 as well as a base member 18 arranged between the flanges 12, 14 onto which webbing of the seat belt can be wound. At the second flange 14 a locking mechanism 18 is provided which is adapted, upon accelerated rotation of the belt reel 10, for example triggered by a sudden webbing extension, to trigger a blocking mechanism adapted to engage in a toothing 20 at the second flange 14 and to block the belt reel 10 so as to prevent further webbing extension.

Figure 2:
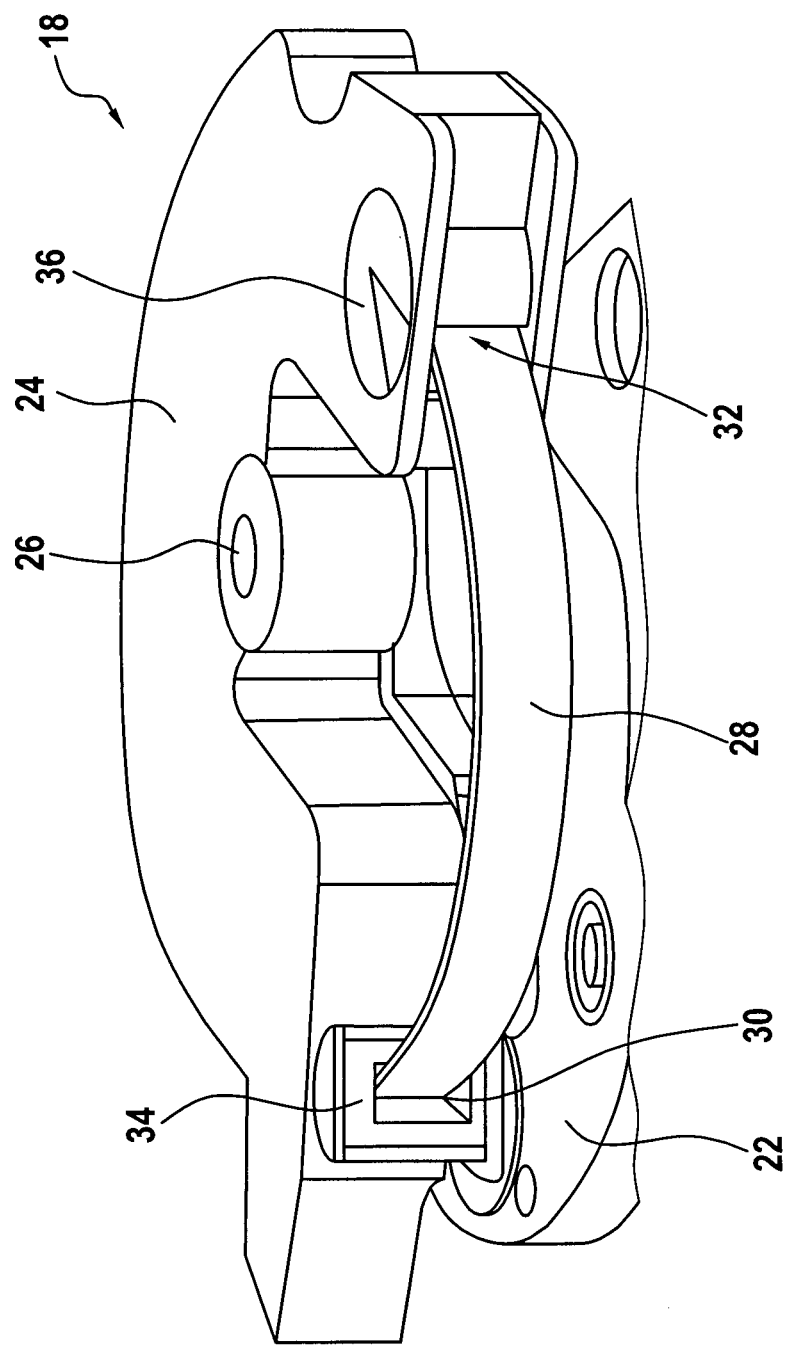
FIG. 2 shows a detail view of the looking mechanism of the belt reel from FIG. 1.

As is evident from the FIGS. 1 and 2, the locking mechanism 18 includes a carrier 22 coupled to the second flange 14 of the belt reel 10. Furthermore, at the second flange 14 an inertia mass 24 is provided which is pivoting relative to the carrier 22 about a support 28. The inertia mass 24 is coupled to the carrier 22 via a biased leaf spring 28.

In the embodiment shown here the leaf spring 28 is biased In arc shape in a plane arranged perpendicularly to the axis of the belt reel and is supported by a respective spring end 30, 32 in a seat 34, 36 at the carrier 22 or the inertia mass 24, respectively.

By the biased leaf spring 28 the inertia mass 24 is co-moved with the carrier 22 and thus with the belt reel 10 during regular operation of the belt reel 10, i.e. a slow webbing extension or webbing draw-in.

When the belt reel 10 is accelerated more strongly, for example by a quick webbing extension, the inertia mass 24 lags behind the movement of the carrier 22 coupled to the belt reel 10, wherein the leaf spring 28 is biased. By the mutual displacement of the inertia mass 24 and the carrier 22 a blocking mechanism engaging in the toothing 20 of the belt reel 10 and blocking the same which is not shown in detail here is actuated.

The responsive behavior of the looking mechanism 18, i.e. the acceleration during which the inertia mass 24 lags behind the movement of the carrier 22, on the one hand is dependent on the mass and, resp., the support of the inertia mass 24 and on the other hand the responsive behavior is dependent on the spring hardness and the bias of the leaf spring 28.

When the leaf spring 28 is biased more strongly and has a greater spring hardness, resp., the inertia mass 24 is still co-moved with the carrier 22 even in the case of faster accelerations. When the leaf spring 28 is less biased or has lower spring rigidity, already in the case of lower acceleration forces the inertia mass 24 lags behind so that blocking of the belt reel 10 is triggered already In the case of lower accelerations.

The legal specifications prescribe that the locking mechanism 18 has to be triggered at a webbing extension acceleration of from 0.8 to 2 g. However, triggering within a substantially narrower range between 1.4 to 1.5 and 2 g is strived for.

Figure 3:
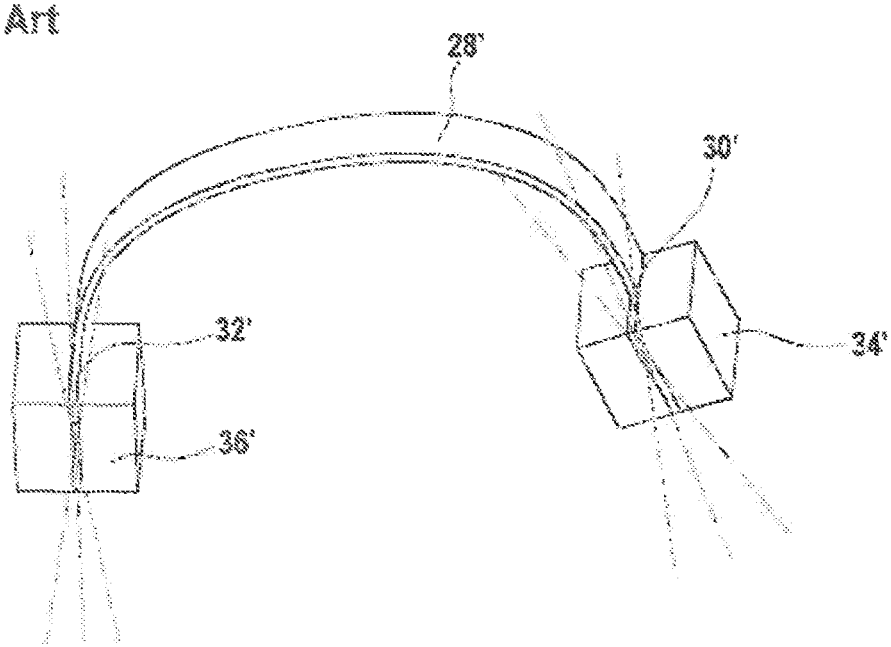
FIG. 3 shows a schematic representation of a leaf spring of a locking mechanism from the state of the art.

In FIG. 3 seats 34', 38' of a state-of-the-art leaf spring 28' are schematically illustrated in which the spring ends 30', 32' are tightly clamped in the seats 34', 36'.

In the case of strong acceleration during which the inertia mass 24' lags behind the movement of the carrier 22', the seats 34', 36' are displaced against each other. In this way the distance of the seats 34', 36' relative to each other varies. This change of distance entails a variation of the bias of the leaf spring 28'. Due to the varied bias the responsive behavior, i.e. the acceleration during which the locking mechanism 18' is triggered, varies, however.

Due to the pivoting of the seats 34', 36' also the orientation of the spring ends 30', 32' relative to each other is varied, however, thereby the spring bias being additionally varied. The required range of acceleration at which the locking mechanism 18' is triggered is difficult to observe due to these variations of the bias.

Figure 4:
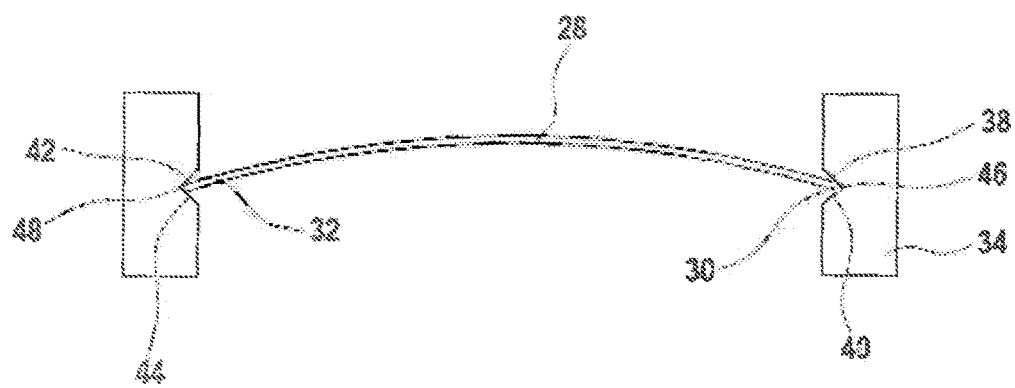
FIG. 4 is a schematic representation of the leaf spring of the locking mechanism from FIG. 2.

In FIG. 4 the seats 34, 36 of the leaf spring 28 according to the invention are schematically represented. The seats 34, 38 are V-shaped and each has a side face 38, 40 and 42, 44, respectively. Each of the side faces 38, 40 and, resp., 42 and 44 encloses an angle of approx. 90°, wherein the spring ends 30, 32 contact exclusively the bottom 48, 48 of the seats, i.e. the intersection point the two side faces 38, 40, 42, 44.

The ends of the leaf spring 28 are pivoted to a limited extent in the respective seat 34, 36 by this support, wherein the pivot angle is restricted by the side faces 38, 40, 42, 44.

Although in the case of mutual pivoting of the inertia mass 24 and the carrier 22 the distance of the seats 34, 36 is varied and thus the bias of the leaf spring 28 is slightly varied by this pivotal support of the spring ends 30, 32 of the leaf spring 28, the spring ends 30, 32 can freely orientate themselves, however, so that no further change of the spring bias occurs due to the orientation of the spring ends 30, 32.

The spring bias thus is dependent exclusively on the distance of the seats 34, 36 and not on the orientation or pivoting of the seats 34, 36. In this way substantially smaller deviations of the desired spring bias occur so that the acceleration at which the locking mechanism 18 is triggered can be adjusted by far more exactly.

The V-shaped seats used in this embodiment offer the advantage that each of the spring ends 30, 32 can pivot about the bottom 46, 48 of the seats 34, 36, i.e. the center of gravity is defined. The seats can also have a clearance, however, which takes a different shape. It has merely to be ensured that the spring ends 30, 32 are freely movable and freely pivoting, resp., in the seats 34, 36 so that free orientation of the leaf spring 28 is possible.

As an alternative it is imaginable that each of the seats includes a retaining element rotatable to a limited extent in which the spring ends 30, 32 of the leaf spring 28 are clamped or fixed. The limited rotatability of the spring ends 30, 32 is brought about by the retaining element in this case which is supported to be freely rotatable or rotatable to a limited extent on the inertia mass 24 and on the carrier 22, respectively.

The invention claimed is:

1. A locking mechanism (18) for a belt reel (10) of a belt retractor in a vehicle comprising a carrier (22) coupled to a belt reel (10) of the belt retractor, an inertia mass (24) pivoting relative to the carrier (22), a leaf spring (28) applying the inertia mass (24) in a home position, and a seat (34, 36) at each of the carrier (22) and the inertia mass (24) for spring ends (30, 32) of the leaf spring (28), wherein opposite terminal end faces of the leaf spring pivot in one of the respective seats.

2. The locking mechanism according to claim 1, wherein each of the seats (34, 36) includes a clearance in which the spring end (30, 32) of the leaf spring (28) is inserted.

3. The locking mechanism according to claim 2, wherein the clearance is V-shaped.

4. The locking mechanism according to claim 2, wherein side faces of the clearance enclose an angle of up to 90°.

5. The locking mechanism according to claim 1, wherein each of the seats (34, 36) includes a rotatable retaining element, the spring ends of the leaf spring being at least one of clamped and fixed in the respective retaining element.

6. The locking mechanism according to claim 1, wherein the leaf spring (28) is biased in a plane arranged perpendicularly to an axis of the belt reel (10).

7. A locking mechanism for a belt retractor belt reel, the locking mechanism comprising:
   a carrier coupled for rotation with the belt reel;
   an inertia mass pivotable relative to the carrier;
   a leaf spring exerting a biasing force on the inertia mass to move the inertia mass toward a home position;
   a first seat provided on the carrier; and
   a second seat provided on the inertia mass;
   wherein terminal ends of the leaf spring are received in the first seat and second seat, respectively, and freely movable within the respective seat such that the biasing force exerted on the inertia mass by the leaf spring remains substantially constant during operation of the locking mechanism.

8. The locking mechanism according to claim 7, wherein the first seat and the second seat each include a clearance in which the terminal ends of the leaf spring are inserted.

9. The locking mechanism according to claim 8, wherein the clearance is V-shaped.

10. The locking mechanism according to claim 9, wherein side faces of the clearance enclose an angle of up to 90°.

11. The locking mechanism according to claim 7, wherein the leaf spring is biased in a plane extending perpendicular to an axis of the belt reel.

12. A locking mechanism for a belt retractor belt reel, the locking mechanism comprising:
   a carrier coupled for rotation with the belt reel;
   an inertia mass pivotable relative to the carrier;
   a leaf spring biasing the inertia mass toward a home position;
   a first seat provided on the carrier for a first terminal end of the leaf spring; and
   a second seat provided on the inertia mass for a second terminal end of the leaf spring;
   wherein the leaf spring contacts the first seat and the second seat only at the first terminal end and the second terminal end, respectively.

13. The locking mechanism according to claim 12, wherein the first seat and the second seat each include a clearance in which the terminal ends of the leaf spring are inserted.

14. The locking mechanism according to claim 13, wherein the clearance is V-shaped.

15. The locking mechanism according to claim 14, wherein side faces of the clearance enclose an angle of up to 90°.

16. The locking mechanism according to claim 12, wherein the leaf spring is biased in a plane extending perpendicular to an axis of the belt reel.

\* \* \* \* \*